United States Patent
Fukuta et al.

(10) Patent No.: US 9,338,722 B2
(45) Date of Patent: May 10, 2016

(54) MOBILE COMMUNICATION METHOD

(71) Applicant: KYOCERA CORPORATION, Kyoto (JP)

(72) Inventors: Noriyoshi Fukuta, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/355,311

(22) PCT Filed: Nov. 2, 2012

(86) PCT No.: PCT/JP2012/078524
§ 371 (c)(1),
(2) Date: Apr. 30, 2014

(87) PCT Pub. No.: WO2013/065843
PCT Pub. Date: May 10, 2013

(65) Prior Publication Data
US 2014/0364126 A1 Dec. 11, 2014

Related U.S. Application Data

(60) Provisional application No. 61/555,174, filed on Nov. 3, 2011.

(51) Int. Cl.
*H04W 36/32* (2009.01)
*H04W 36/20* (2009.01)
*H04W 36/06* (2009.01)

(52) U.S. Cl.
CPC .............. *H04W 36/32* (2013.01); *H04W 36/20* (2013.01); *H04W 36/06* (2013.01)

(58) Field of Classification Search
None
See application file for complete search history.

(56) References Cited

U.S. PATENT DOCUMENTS

| | | | |
|---|---|---|---|
| 2003/0060213 A1* | 3/2003 | Heinonen | G01S 5/02 455/456.1 |
| 2003/0069027 A1* | 4/2003 | Heinonen | H04W 64/00 455/456.1 |

(Continued)

FOREIGN PATENT DOCUMENTS

| | | |
|---|---|---|
| EP | 2288206 A1 | 2/2011 |
| JP | H10-075231 A | 3/1998 |

(Continued)

OTHER PUBLICATIONS

International Search Report; PCT/JP2012/078524; Jan. 29, 2013.

(Continued)

*Primary Examiner* — Kimberly A Williams
(74) *Attorney, Agent, or Firm* — Studebaker & Brackett PC

(57) ABSTRACT

A mobile communication method is applied to a mobile communication system including a general base station and a specific base station. A distance between an edge closest to the general base station among edges of a coverage area of the specific cell and the general base station is a distance $L_{MIN}$. A distance between an edge most distant from the general base station among the edges of the coverage area of the specific cell and the general base station is a distance $L_{MAX}$. The mobile communication method comprises: a step A of instructing, by the general base station, a general mobile terminal, located in a belt-like annular area indicating a range from the distance $L_{MIN}$ to the distance $L_{MAX}$ in a connected state in the general cell, to perform handover to a frequency different from a frequency used in the specific cell.

2 Claims, 10 Drawing Sheets

(56) References Cited

U.S. PATENT DOCUMENTS

| | | | |
|---|---|---|---|
| 2005/0130662 A1* | 6/2005 | Murai | H04J 11/004 455/444 |
| 2009/0042593 A1 | 2/2009 | Yavuz et al. | |
| 2009/0285113 A1 | 11/2009 | Yavuz et al. | |
| 2009/0291690 A1* | 11/2009 | Guvenc | H04W 16/10 455/444 |
| 2010/0015921 A1* | 1/2010 | Yavuz | H04W 72/085 455/63.1 |
| 2010/0124927 A1* | 5/2010 | Eskicioglu | H04W 36/32 455/436 |
| 2010/0216486 A1* | 8/2010 | Kwon | H04W 72/0426 455/452.2 |
| 2010/0322190 A1* | 12/2010 | Satou | H04W 56/00 370/331 |
| 2011/0122841 A1* | 5/2011 | Aoyagi | H04W 36/08 370/331 |
| 2011/0312340 A1* | 12/2011 | Wu | G01S 5/04 455/456.1 |
| 2012/0149363 A1* | 6/2012 | Faerber | H04W 52/04 455/423 |
| 2012/0157105 A1 | 6/2012 | Grob-Lipski | |
| 2012/0252469 A1 | 10/2012 | Okino | |
| 2014/0226630 A1* | 8/2014 | Comstock | H04W 16/14 370/331 |
| 2014/0328309 A1* | 11/2014 | Comstock | H04W 72/082 370/329 |

FOREIGN PATENT DOCUMENTS

| | | |
|---|---|---|
| JP | 2001-218245 A | 8/2001 |
| JP | 2011-523271 A | 8/2011 |
| WO | 2011/065493 A1 | 6/2011 |

OTHER PUBLICATIONS

3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

Communication pursuant to Rule 164(1) EPC issued by the European Patent Office on Jul. 6, 2015, which corresponds to European Patent Application No. 12846179.5-1854 and is related to U.S. Appl. No. 14/355,311.

* cited by examiner

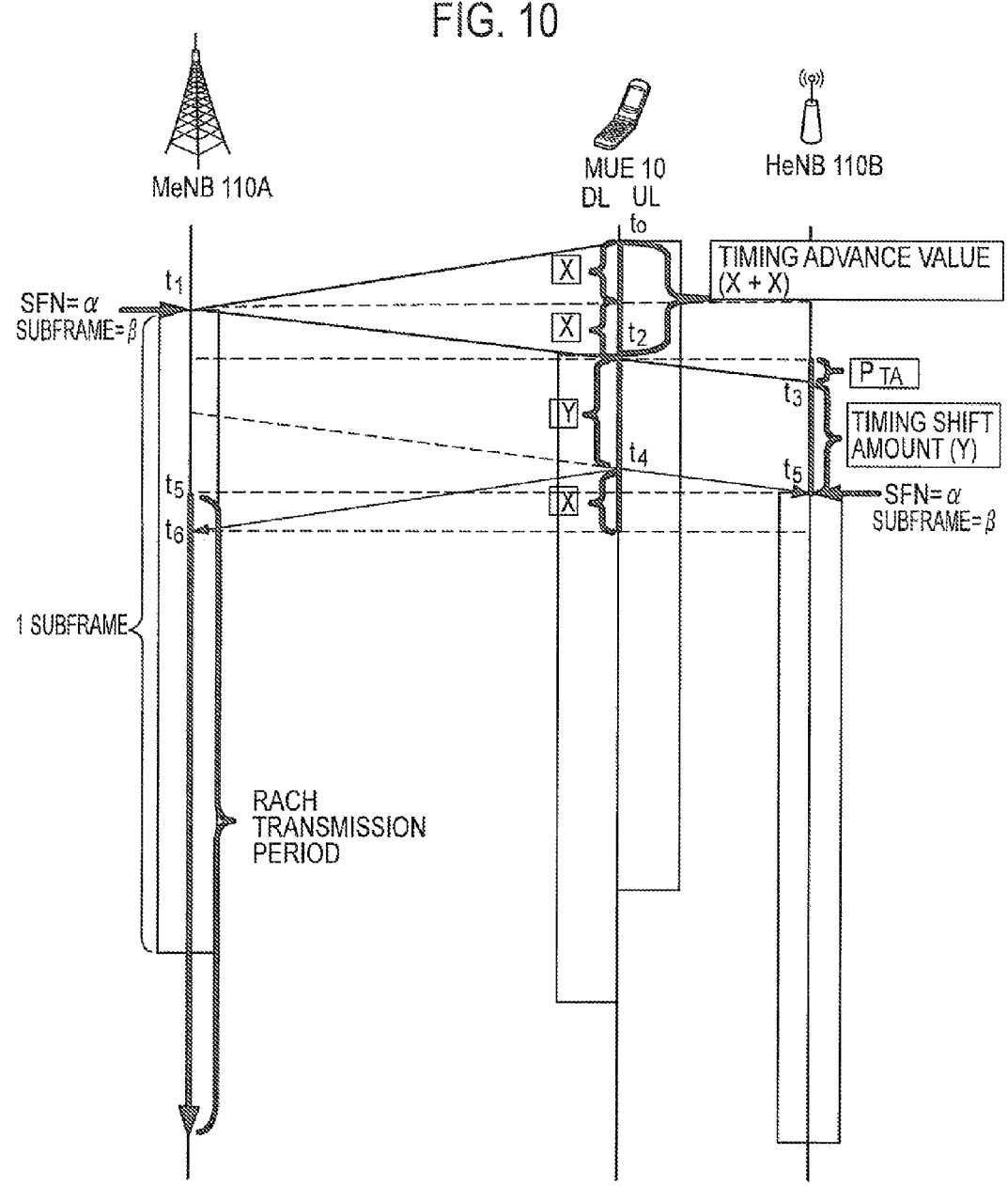

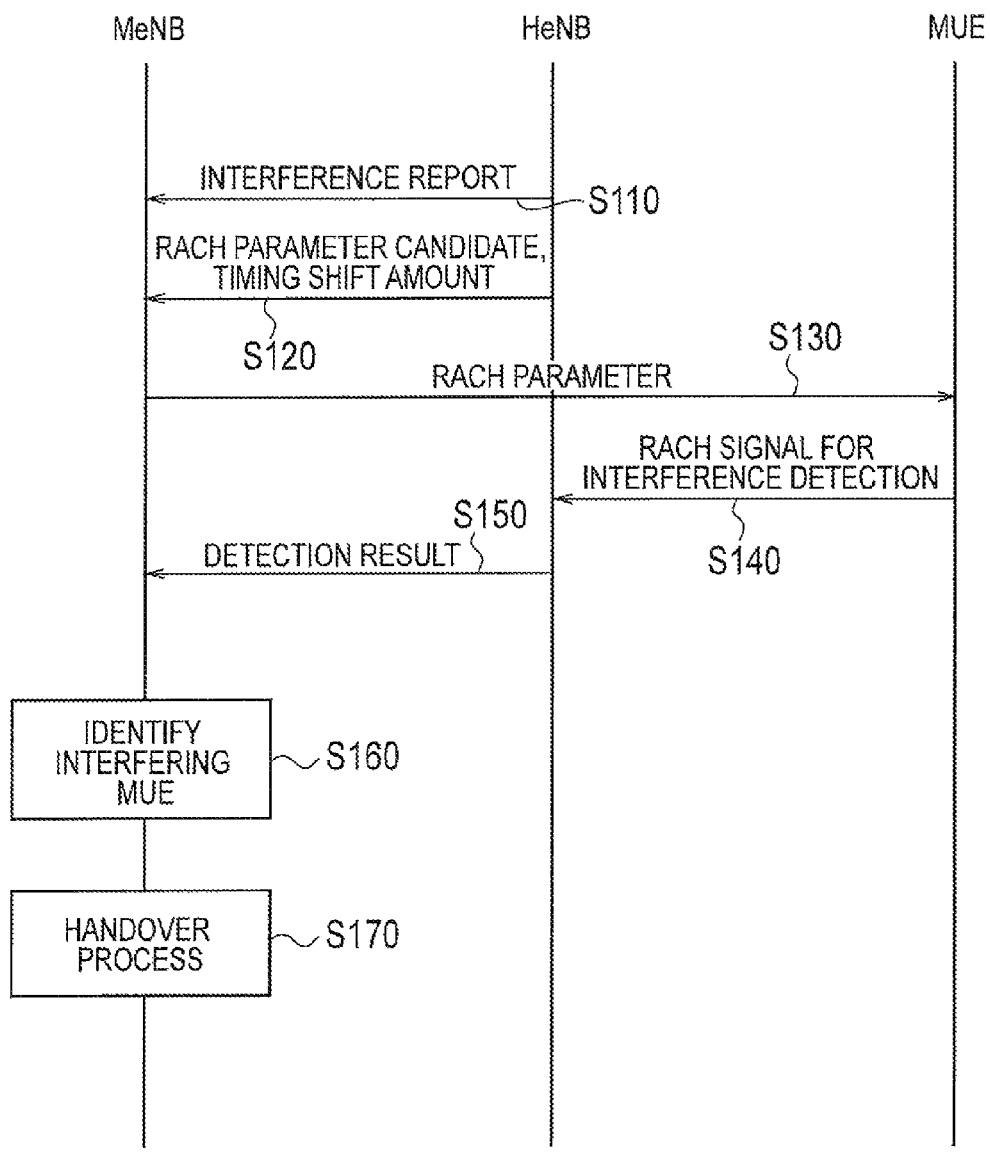

MOBILE COMMUNICATION METHOD

TECHNICAL FIELD

The present invention relates to a mobile communication method applied to a mobile communication system in which a general cell and a specific cell are coexisting.

BACKGROUND ART

In recent years, there has been proposed a next generation mobile communication system such as LTE (Long Term Evolution).

In the mobile communication system, it is assumed that a plurality of types of cells (for example, a general cell and a specific cell) having different coverage areas are coexisting. The coverage area of the general cell is larger than a coverage area of the specific cell. The general cell, for example, includes a macro cell provided by a communication provider. The specific cell, for example, includes a femto cell or a home cell provided by the third party other than the communication provider. The specific cell may include a CSG (Closed Subscriber Group) cell or a pico cell provided by the communication provider.

Here, the coverage area of the specific cell is considered to exist in the coverage area of the general cell. In such a case, an uplink signal transmitted from a mobile terminal (hereinafter, a general mobile terminal) in an idle state or a connected state in the general cell is considered to give interference to the specific cell.

However, the general cell is not able to identify the general mobile terminal that gives interference to the specific cell. Therefore, even when a signal (for example, OI: Overload Indicator) indicating the occurrence of interference is transmitted from the specific cell to the general cell, the general cell is not able to resolve the interference given to the specific cell.

CITATION LIST

Non-Patent Documents

Non-Patent Documents 1:3GPP TS36.300 v9.4.0

SUMMARY OF INVENTION

A mobile communication method according to a first feature is applied to a mobile communication system including a general base station that manages a general cell and a specific base station that manages a specific cell having a coverage area smaller than a coverage area of the general cell. A distance between an edge closest to the general base station among edges of a coverage area of the specific cell and the general base station is a distance $L_{MIN}$. A distance between an edge most distant from the general base station among the edges of the coverage area of the specific cell and the general base station is a distance $L_{MAX}$. The mobile communication method comprises: a step A of instructing, by the general base station, a general mobile terminal to perform handover to a frequency different from a frequency used in the specific cell, the general mobile terminal being located in a belt-like annular area indicating a range from the distance $L_{MIN}$ to the distance $L_{MAX}$ among general mobile terminals being mobile terminals in a connected state in the general cell.

In the first feature, the belt-like annular area is determined based on a difference between a synchronization timing of a downlink signal of the mobile terminal to perform handover from the general cell to the specific cell and a synchronization timing of an uplink signal of the mobile terminal to perform handover from the general cell to the specific cell.

In the first feature, the belt-like annular area is determined based on a synchronization timing correction value of an uplink signal of the mobile terminal to perform handover from the specific cell to the general cell.

In the first feature, the mobile communication method comprises: a step B of transmitting, from the specific base station to the general base station, an interference report indicating occurrence of interference in the specific cell. In the step A, the general base station instructs the general mobile terminal to perform the handover in response to the interference report.

In the first feature, the general base station stores a geographical position of the specific base station. The mobile communication method comprises: a step C of instructing, by the general base station, the general mobile terminal to perform handover to a frequency equal to the frequency used in the specific cell, the general mobile terminal being sufficiently apart from the coverage area of the specific cell among the general mobile terminals which performed the handover to the frequency different from the frequency used in the specific cell.

In the first feature, the general mobile terminal stores a geographical position according to which the handover to the frequency different from the frequency used in the specific cell has been instructed. The mobile communication method comprises: a step D of transmitting, from the general mobile terminal to the general base station, a proximity notification signal when a position of the general mobile terminal is a stored position, the proximity notification signal indicating that the general mobile terminal is located in a vicinity of the specific cell.

In the first feature, the mobile communication method comprises: a step E of instructing, by the general base station, the general mobile terminal to perform the handover to a frequency different from the frequency used in the specific cell in response to the proximity notification signal.

In the first feature, the mobile communication method comprises: a step F of excluding in response to the proximity notification signal, by the general base station, the frequency used in the specific cell from candidates for a frequency used in the general mobile terminal transmitting the proximity notification signal.

A mobile communication method according to a second feature is applied to a mobile communication system including a general base station that manages a general cell and a specific base station that manages a specific cell having a coverage area smaller than a coverage area of the general cell. A distance between an edge closest to the general base station among edges of a coverage area of the specific cell and the general base station is a distance $L_{MIN}$. A distance between an edge most distant from the general base station among the edges of the coverage area of the specific cell and the general base station is a distance $L_{MAX}$. The mobile communication method comprises: a step A of transmitting, from a general mobile terminal to the specific base station, an RACH signal for interference detection, the general mobile terminal being located in a belt-like annular area indicating a range from the distance $L_{MIN}$ to the distance $L_{MAX}$ among general mobile terminals being mobile terminals in a connected state in the general cell; and a step B of notifying, by the specific base station, the general base station of a detection result of the RACH signal for interference detection.

In the second feature, the belt-like annular area is determined based on a difference between a synchronization timing of a downlink signal of the mobile terminal to perform handover from the general cell to the specific cell and a synchronization timing of an uplink signal of the mobile terminal to perform handover from the general cell to the specific cell.

In the second feature, the belt-like annular area is determined based on a synchronization timing correction value of an uplink signal of the mobile terminal to perform handover from the specific cell to the general cell.

In the second feature, the mobile communication method comprises: a step C of transmitting, from the general base station to the general mobile terminal, an RACH parameter used in transmission of the RACH signal for interference detection and a transmission timing of the RACH signal for interference detection. The transmission timing of the RACH signal for interference detection is determined based on a timing shift amount between the general cell and the specific cell.

In the second feature, the mobile communication method comprises: a step D of notifying, by the specific base station, the general base station of an RACH parameter candidate for selecting the RACH parameter.

In the second feature, when interference occurs in the specific cell, in the step D, the specific base station notifies the general base station of the RACH parameter candidate.

In the second feature, the mobile communication method comprises: a step E of restricting, by the general base station, scheduling of an uplink radio resource with no assigning the uplink radio resource to the general cell within an RACH transmission period in which the RACH signal for interference detection is transmitted.

BRIEF DESCRIPTION OF THE DRAWINGS

FIG. 10 is a diagram illustrating a transmission timing of an RACH signal for interference detection according to a second embodiment.

FIG. 11 is a sequence diagram illustrating an operation of the mobile communication system 100 according to the second embodiment.

DESCRIPTION OF EMBODIMENTS

Figure 1:
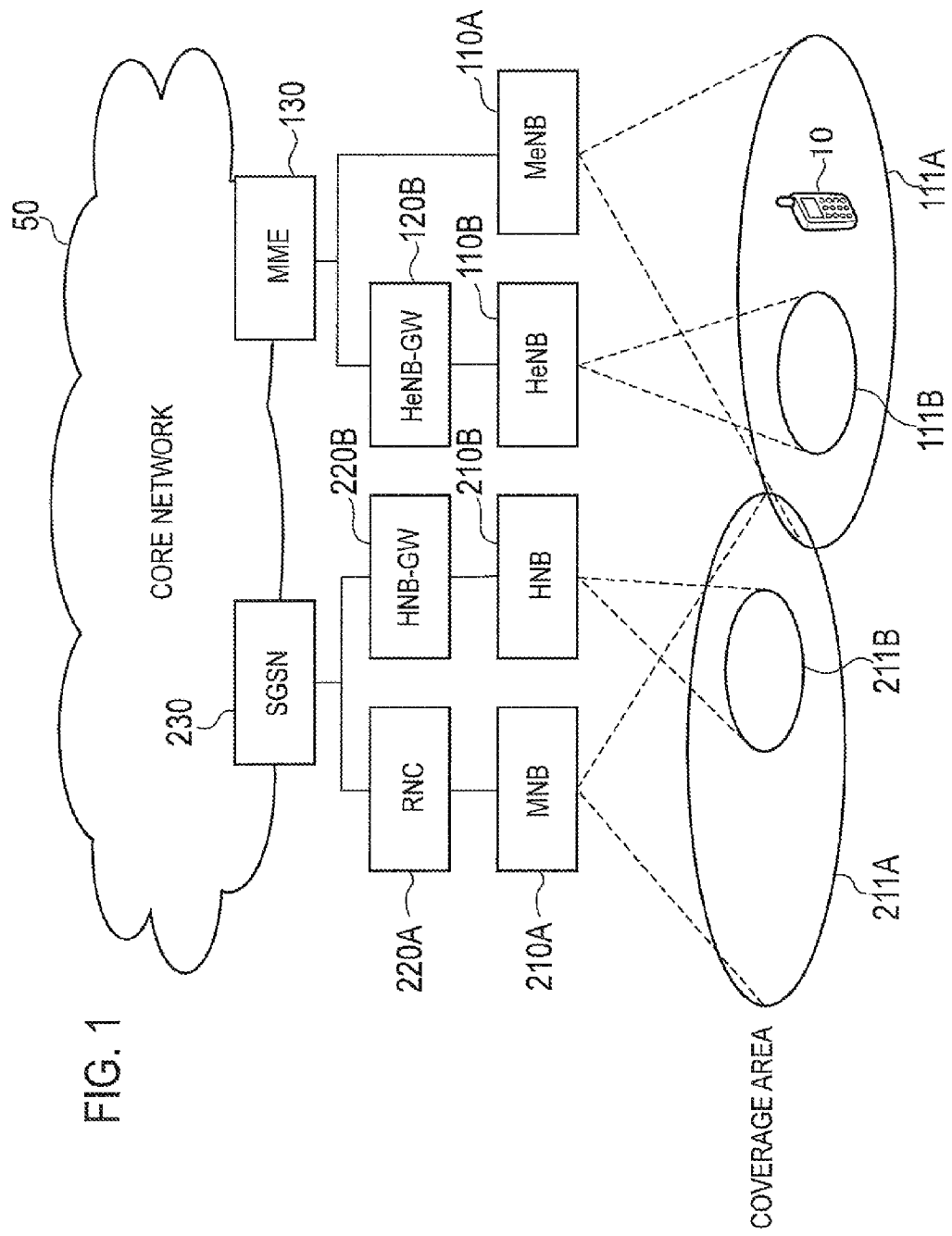
FIG. 1 is a diagram illustrating a mobile communication system 100 according to a first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

SUMMARY OF EMBODIMENTS

A mobile communication method according to an embodiment is applied to a mobile communication system including a general base station that manages a general cell, and a specific base station that manages a specific cell having a coverage area smaller than a coverage area of the general cell. A distance between an edge closest to the general base station among edges of a coverage area of the specific cell and the general base station is a distance $L_{MIN}$. A distance between an edge most distant from the general base station among the edges of the coverage area of the specific cell and the general base station is a distance $L_{MAX}$. The mobile communication method comprises: a step A of instructing, by the general base station, a general mobile terminal to perform handover to a frequency different from a frequency used in the specific cell, the general mobile terminal being located in a belt-like annular area indicating a range from the distance $L_{MIN}$ to the distance $L_{MAX}$ among general mobile terminals being mobile terminals in a connected state in the general cell.

In the embodiment, the general base station instructs the general mobile terminal, which is located in the belt-like annular area indicating the range from the distance $L_{MIN}$ to the distance $L_{MAX}$, to perform the handover to the frequency different from the frequency used in the specific cell. Consequently, even when it is not possible to identify an interference source (a general mobile terminal) of interference given to the specific cell, interference occurring in the specific cell is suppressed.

First Embodiment

Mobile Communication System

Hereinafter, a mobile communication system according to a first embodiment will be described. FIG. 1 is a diagram illustrating a mobile communication system 100 according to a first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, MeNB 110A), a home base station 110B (hereinafter, HeNB 110B), a home base station gateway 120B (hereinafter, HeNB-GW 120B), and MME 130.

A radio access network (E-UTRAN; Evolved Universal Terrestrial Radio Access Network) corresponding to the first communication system is configured from the MeNB 110A, the HeNB 110B, and the HeNB-GW 120B.

The second communication system, for example, is a communication system corresponding to UMTS (Universal Mobile Telecommunication System). The second communication system includes a base station 210A (hereinafter, MNB 210A), a home base station 210B (hereinafter, HNB 210B), RNC 220A, a home base station gateway 220B (hereinafter, HNB-GW 220B), and SGSN 230.

A radio access network (UTRAN; Universal Terrestrial Radio Access Network) corresponding to the second communication system is configured from the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) configured to perform radio communication with the UE 10 being present in the general cell 111A.

The HeNB 110B, which manages a specific cell 111B, is a device (Home evolved NodeB) configured to perform radio communication with the UE 10 being present in the specific cell 111B.

The HeNB-GW 120B, which is connected to the HeNB 110B, is a device (Home evolved NodeB Gateway) configured to manage the HeNB 110B.

The MME 130, which is connected to the MeNB 110A, is a device (Mobility Management Entity) configured to manage the mobility of the UE 10 having set up a radio connection with the MeNB 110A. Furthermore, the MME 130, which is connected to the HeNB 110B via the HeNB-GW 120B, is a device configured to manage the mobility of the UE 10 having set up a radio connection with the HeNB 110B.

The MNB 210A, which manages a general cell 211A, is a device (NodeB) configured to perform radio communication with the UE 10 being present in the general cell 211A.

The HNB 210B, which manages a specific cell 211B, is a device (Home NodeB) configured to perform radio communication with the UE 10 being present in the specific cell 211B.

The RNC 220A, which is connected to the MNB 210A, is a device (Radio Network Controller) configured to set up a radio connection (RRC Connection) with the UE 10 being present in the general cell 211A.

The HNB-GW 220B, which is connected to the HNB 210B, is a device (Home NodeB Gateway) configured to set up a radio connection (RRC Connection) with the UE 10 being present in the specific cell 211B.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

Furthermore, the general cell and the specific cell must be understood as functions of performing radio communication with the UE 10. However, the general cell and the specific cell are also used as terms indicating coverage areas of cells. Also, cells such as the general cell and the specific cell are identified based on the frequency used in the cell, the spreading code, the time slot, or the like.

Here, a coverage area of the general cell is larger than a coverage area of the specific cell. The general cell, for example, includes a macro cell provided by a communication provider. The specific cell, for example, includes a femto cell or a home cell provided by the third party other than the communication provider. The specific cell may include a CSG (Closed Subscriber Group) cell or a pico cell provided by the communication provider.

Hereinafter, the first communication system will be mainly described. The following description may also be applied to the second communication system.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is a channel used to transfer a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying a recommended modulation method and an encoding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted via the downlink channel (for example, the PDSCH) has been successfully received.

The uplink shared channel is a channel used to transfer a control signal (including the above-mentioned control signal) and/or a data signal. For example, the uplink radio resource may be assigned only to the data signal, or assigned such that the data signal and the control signal are multiplexed.

The downlink control channel is a channel used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted via the uplink channel.

The downlink shared channel is a channel used to transfer a control signal and/or a data signal. For example, the downlink radio resource may be assigned only to the data signal, or assigned such that the data signal and the control signal are multiplexed.

In addition, a control signal transmitted via the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal transmitted via a channel, other than the downlink control channel (the PDCCH) and the downlink shared channel (the PDSCH), includes ACK/NACK. The ACK/NACK is a signal indicating whether a signal transmitted via the uplink channel (for example, the PUSCH) has been successfully received.

The general cell and the specific cell broadcast broadcast information via a broadcast channel (BCCH; Broadcast Control Channel). The broadcast information, for example, is information such as MIB (Master Information Block) or SIB (System Information Block).

(Radio Frame)

Figure 2:
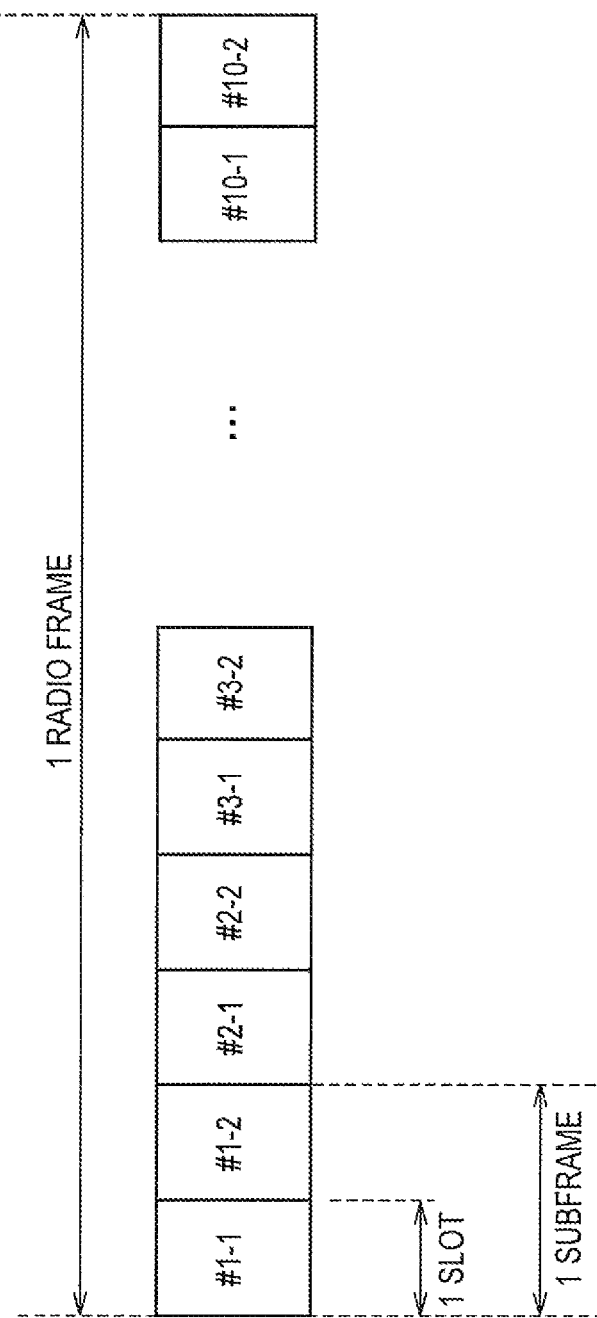
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. In the same manner, one slot is configured by a plurality of SC-FDMA symbols (for example, six SC-FDMA symbols or seven SC-FDMA symbols) in the upward direction.

(Radio Resource)

Figure 3:
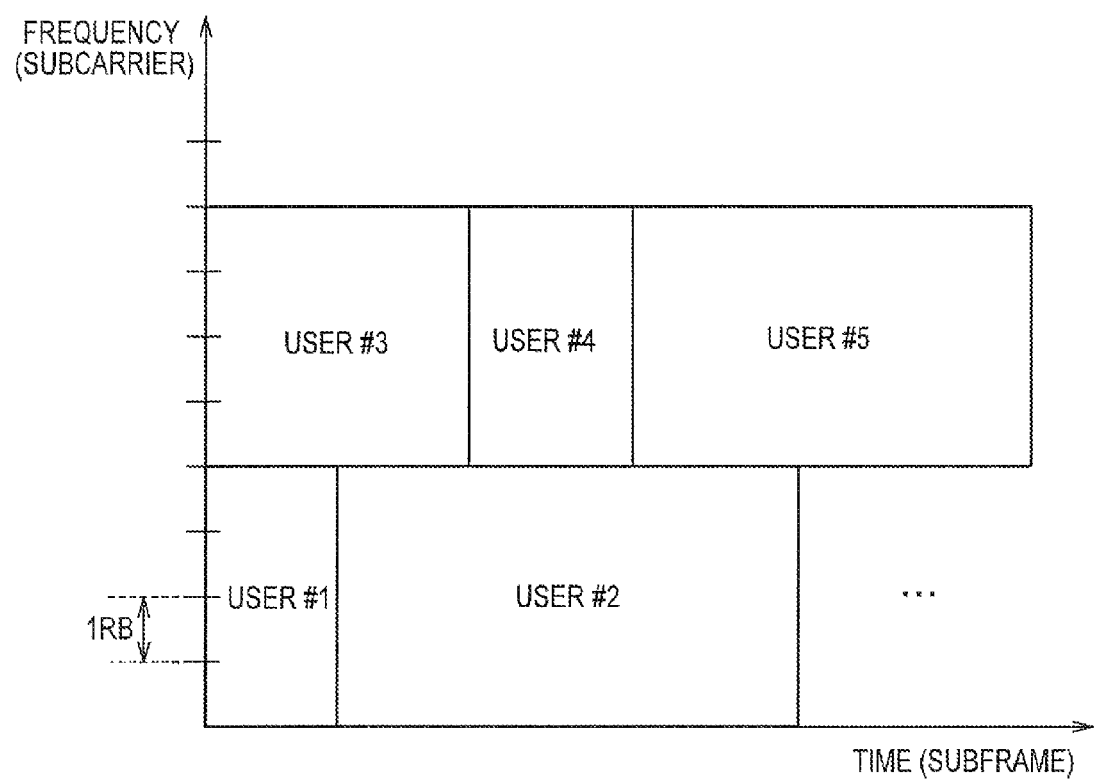
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the MeNB 110A. The MeNB 110A assigns the radio resource to each UE 10 on the basis of the CQI, the PMI, the RI, and the like.

(Application Scene)

Figure 4:
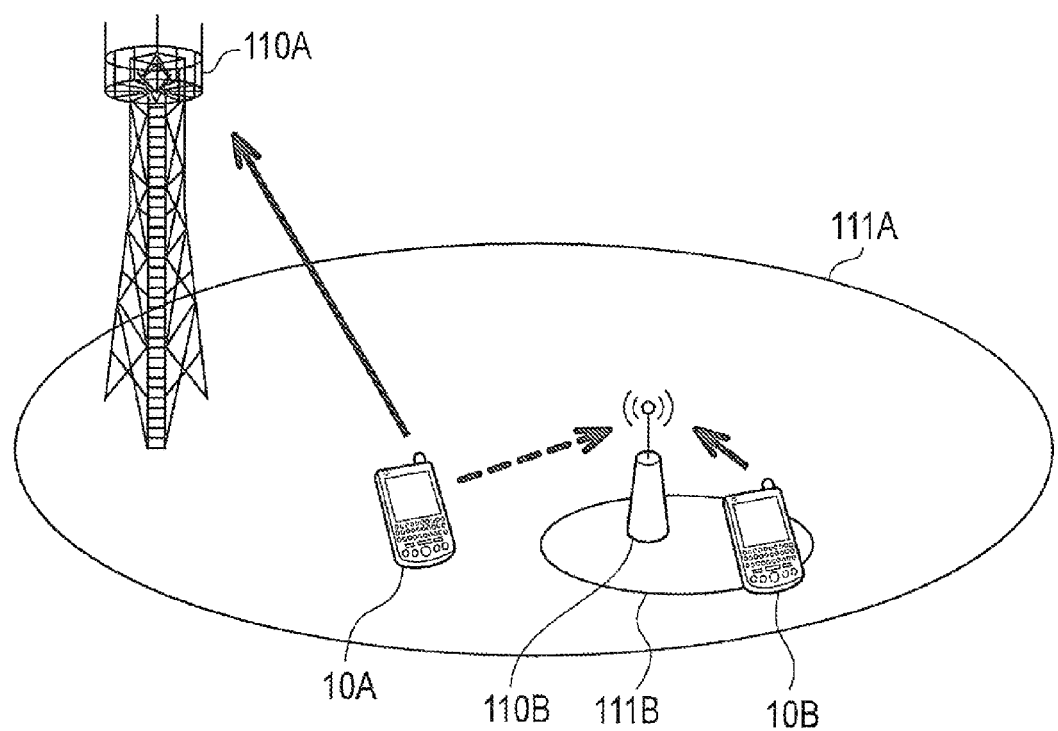
FIG. 4 is a diagram illustrating an application case according to the first embodiment.

Hereinafter, an application scene according to the first embodiment will be described. FIG. 4 is a diagram for explaining the application scene according to the first embodiment. Here, the MeNB 110A is exemplified as the general base station that manages the general cell, and the HeNB 110B is exemplified as the specific base station that manages the specific cell.

Furthermore, the MUE 10A is exemplified as UE 10 (hereinafter, MUE) in a connected state in the general cell 111A. The HUE 10B is exemplified as UE 10 (hereinafter, HUE) in a connected state in the specific cell 111B.

As illustrated in FIG. 4, an uplink signal transmitted from the MUE 10A to the general cell 111A interferes with an uplink signal transmitted from the HUE 10B to the specific cell 111B depending on the position of the MUE 10A.

Since the MUE 10A is in a connected state in the general cell 111A, the specific cell 111B is not able to identify the MUE 10A that gives interference to the specific cell 111B. Furthermore, since the MUE 10A giving interference to the specific cell 111B is not able to receive a downlink signal from the specific cell 111B, the MUE 10A does not understand that the MUE 10A gives interference to an uplink signal of the specific cell 111B. Therefore, in the conventional procedure, the general cell 111A is not able to identify the MUE 10A that gives interference to the specific cell 111B.

However, in the conventional procedure, the HeNB 110B is able to transmit, to the MeNB 110A, an interference report (OI: Overload Indicator) indicating the occurrence of interference in the specific cell 111B. For example, the interference report indicates whether interference occurs in each resource block. Alternatively, the interference report indicates the level of interference occurring in each resource block.

On the other hand, in the first embodiment, the MeNB 110A instructs MUE, which is located in a belt-like annular area indicating the range from a distance $L_{MIN}$ to a distance $L_{MAX}$, to perform handover to a frequency different from a frequency used in the specific cell 111B.

Furthermore, the distance $L_{MIN}$ indicates a distance between an edge closest to the MeNB 110A among edges of the coverage area of the specific cell 111B and the MeNB 110A. The distance $L_{MAX}$ indicates a distance between an edge most distant from the MeNB 110A among the edges of the coverage area of the specific cell 111B and the MeNB 110A.

Figure 5:
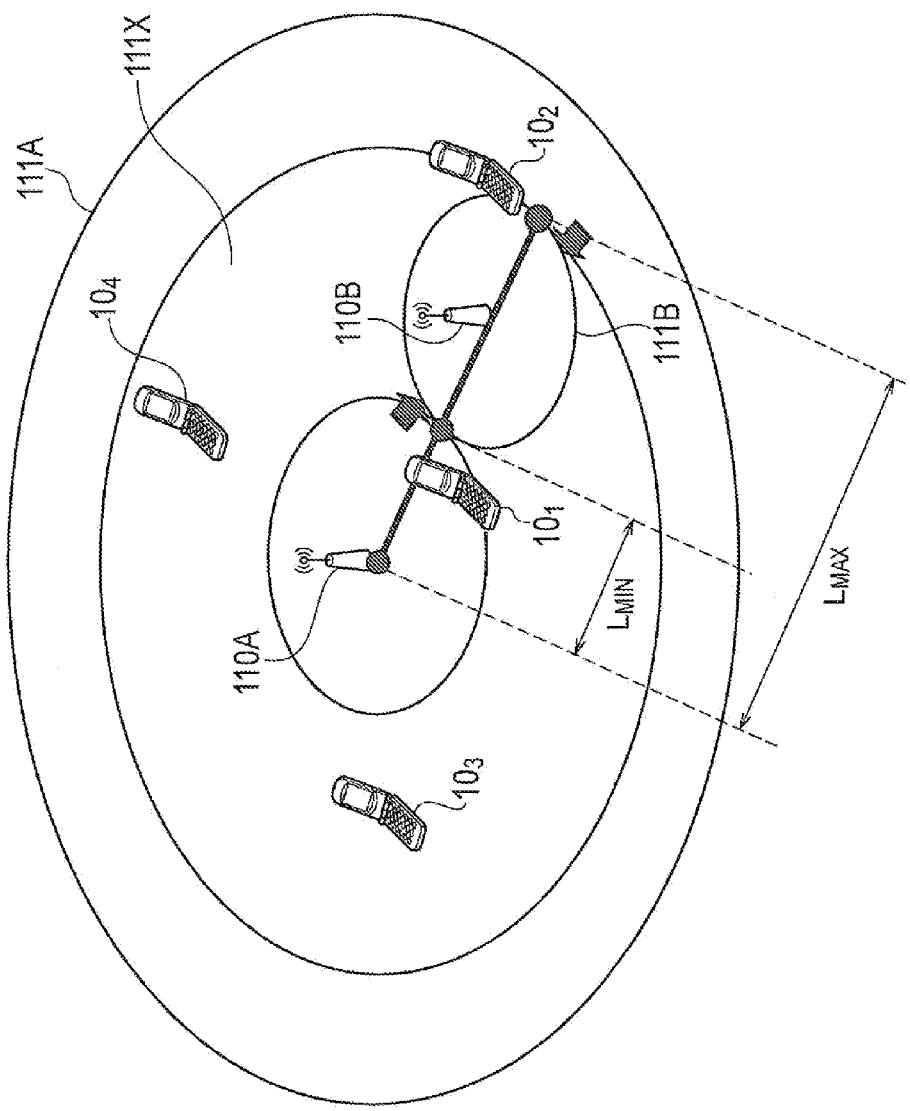
FIG. 5 is a diagram illustrating a belt-like annular area 111X according to the first embodiment.

For example, as illustrated in FIG. 5, a belt-like annular area 111X is determined based on a synchronization timing correction value of an uplink signal, which was set from the general cell 111A immediately before handover of UE 10 (UE $10_1$ and UE $10_2$) that is handed over from the general cell 111A to the specific cell 111B. That is, the belt-like annular area 111X is determined based on TA (Timing Advance) that was set from the general cell 111A immediately before the handover of the UE 10 that is handed over from the general cell 111A to the specific cell 111B. Specifically, the belt-like annular area 111X is an area including the TA in the range from a minimum value−α of the TA to a maximum value+α of the TA. Furthermore, α is a predetermined value.

In such a case, the MeNB 110A instructs UE $10_1$ to UE $10_4$ located in the belt-like annular area 111X to perform the handover to the frequency different from the frequency used in the specific cell 111B.

Figure 6:
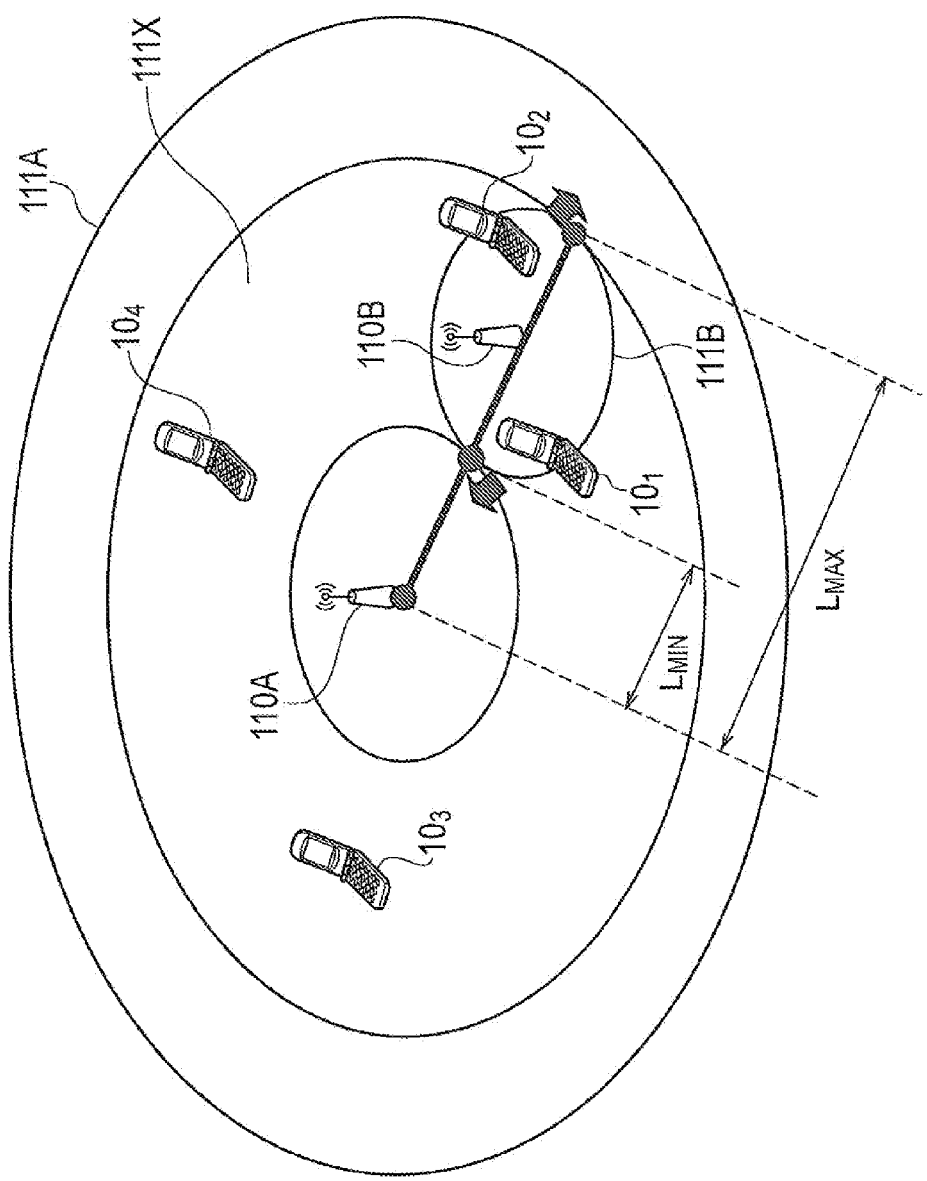
FIG. 6 is a diagram illustrating the belt-like annular area 111X according to the first embodiment.

Alternatively, as illustrated in FIG. 6, the belt-like annular area 111X is determined based on a synchronization timing correction value of an uplink signal of the UE 10 (UE $10_1$ and UE $10_2$) that is handed over from the specific cell 111B to the general cell 111A. Specifically, the belt-like annular area 111X is an area including the synchronization timing correction value in the range from a minimum value−α of the synchronization timing correction value to a maximum value+α of the synchronization timing correction value. Furthermore, α is a predetermined value.

Alternatively, the belt-like annular area 111X is determined based on a synchronization timing correction value of an uplink signal, which is set from the general cell 111A immediately after the handover of the UE 10 (UE $10_1$ and UE $10_2$) that is handed over from the specific cell 111B to the general cell 111A. That is, the belt-like annular area 111X is determined based on a minimum value and a maximum value of TA (Timing Advance) that is set from the general cell 111A immediately after the handover of the UE 10 that is handed over from the specific cell 111B to the general cell 111A.

In such a case, the MeNB 110A instructs UE $10_1$ to UE $10_4$ located in the belt-like annular area 111X to perform the handover to the frequency different from the frequency used in the specific cell 111B.

In the first embodiment, the MeNB 110A stores a geographical position of the HeNB 110B. It is preferable that the MeNB 110A stores the size of the coverage area of the specific cell 111B managed by the HeNB 110B.

It is preferable that the MeNB 110A instructs MUE, which is sufficiently apart from the coverage area of the specific cell 111B among MUEs performed the handover to the frequency different from the frequency used in the specific cell 111B, to perform handover to a frequency equal to the frequency used in the specific cell 111B. In other words, since the MUE sufficiently apart from the coverage area of the specific cell 111B does not give interference to the specific cell 111B, the MeNB 110A turns back a frequency used in the MUE sufficiently apart from the coverage area of the specific cell 111B.

Furthermore, the MeNB 110A is able to approximately identify the position of the MUE sufficiently apart from the coverage area of the specific cell 111B based on an arrival direction of an uplink signal transmitted from the MUE. In other words, when the MeNB 110A stores the geographical position of the HeNB 110B, the MeNB 110A is able to identify MUE that does not apparently give interference to the specific cell 111B.

(General Base Station)

Figure 7:
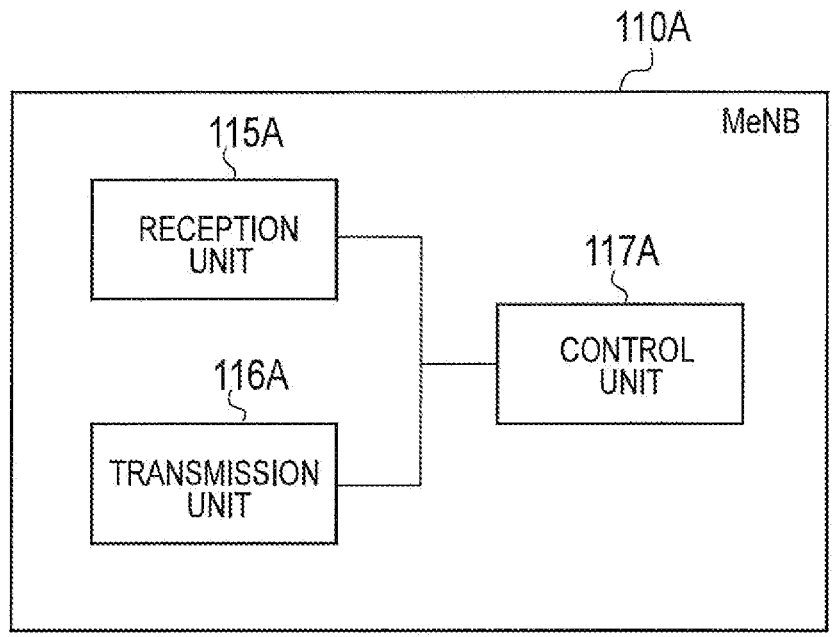
FIG. 7 is a block diagram illustrating MeNB 110A according to the first embodiment.

Hereinafter, the general base station according to the first embodiment will be described. FIG. 7 is a block diagram illustrating the general base station (here, the MeNB 110A) according to the first embodiment.

As illustrated in FIG. 7, the MeNB 110A includes a reception unit 115A, a transmission unit 116A, and a control unit 117A.

The reception unit 115A receives an uplink signal from the UE 10 (for example, the MUE). The reception unit 115A receives a message (for example, the interference report) from the HeNB 110B. The interference report indicates that interference occurred in the specific cell 111B as described above.

The transmission unit 116A transmits a downlink signal to the UE 10 (for example, the MUE). The transmission unit 116A transmits a message to the HeNB 110B.

The control unit 117A controls the operation of the MeNB 110A. For example, the control unit 117A assigns a radio resource to the MUE. The control unit 117A instructs MUE, which is located in the belt-like annular area indicating the range from the distance $L_{MIN}$ to the distance $L_{MAX}$, to perform the handover to the frequency different from the frequency used in the specific cell 111B. Specifically, the control unit 117A controls the operation of the MeNB 110A illustrated in FIG. 9.

(Specific Base Station)

Figure 8:
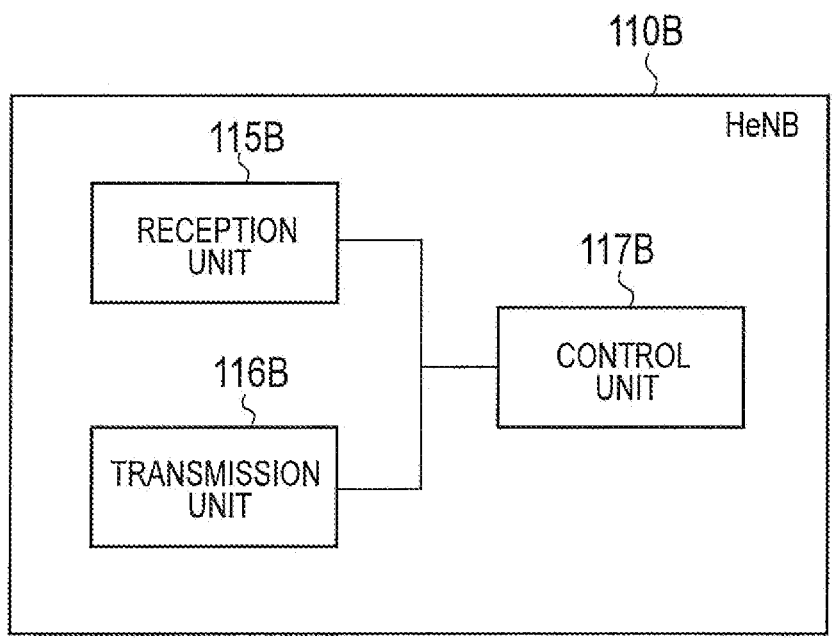
FIG. 8 is a block diagram illustrating HeNB 110B according to the first embodiment.

Hereinafter, the specific base station according to the first embodiment will be described. FIG. 8 is a block diagram illustrating the specific base station (here, the HeNB 110B) according to the first embodiment.

As illustrated in FIG. 8, the HeNB 110B includes a reception unit 115B, a transmission unit 116B, and a control unit 117B.

The reception unit 115B receives an uplink signal from the UE 10 (for example, the HUE). The reception unit 115B receives a message from the MeNB 110A.

The transmission unit 116B transmits a downlink signal to the UE 10 (for example, the HUE). The transmission unit 116B transmits the message (for example, the interference report) to the MeNB 110A.

The control unit 117B controls the HeNB 110B. For example, the control unit 117B assigns a radio resource to the HUE. Specifically, the control unit 117B controls the operation of the HeNB 110B illustrated in FIG. 9.

(Operation of Mobile Communication System)

Figure 9:
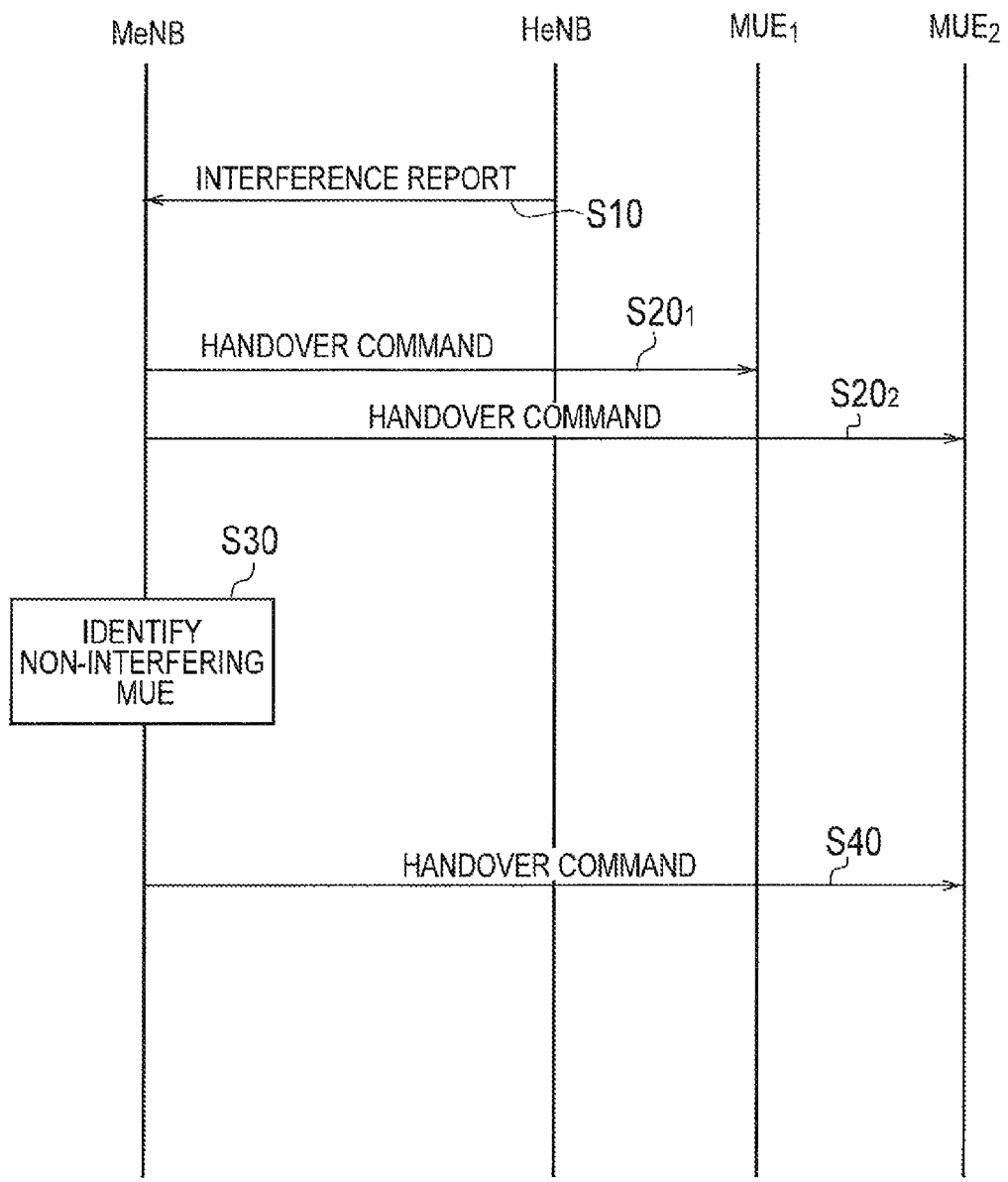
FIG. 9 is a sequence diagram illustrating an operation of the mobile communication system 100 according to the first embodiment.

Hereinafter, the operation of the mobile communication system according to the first embodiment will be described. FIG. 9 is a sequence diagram illustrating an operation of the mobile communication system 100 according to the first embodiment.

Furthermore, $MUE_1$ and $MUE_2$ are UE 10 in a connected state in the general cell 111A and are located in the belt-like annular area 111X. The $MUE_1$ is located in the vicinity of the coverage area of the specific cell 111B and the $MUE_2$ is not located in the vicinity of the coverage area of the specific cell 111B.

As illustrated in FIG. 9, in step 10, the HeNB 110B transmits (notifies), to the MeNB 110A, an interference report indicating that interference occurs in the specific cell 111B.

In step $20_1$, the MeNB 110A transmits a handover instruction, which instructs handover to a frequency different from a frequency used in the specific cell 111B, to the $MUE_1$. In the same manner, in step $20_2$, the MeNB 110A transmits the handover instruction, which instructs the handover to the frequency different from the frequency used in the specific cell 111B, to the $MUE_2$.

In step 30, the MeNB 110A identifies MUE, which is sufficiently apart from the coverage area of the specific cell 111B among MUEs which performed the handover to the frequency different from the frequency used in the specific cell 111B. That is, the MeNB 110A identifies MUE that does not apparently give interference to the specific cell 111B. Furthermore, the $MUE_2$ is identified as such MUE.

In step 40, the MeNB 110A transmits, to the $MUE_2$, a handover instruction, which instructs handover to a frequency equal to the frequency used in the specific cell 111B.

Furthermore, it is preferable that the MeNB 110A determines whether to instruct the handover to the frequency equal to the frequency used in the specific cell 111B based on a radio state in a frequency (a cell) of a handover destination of the step $20_1$ and the step $20_2$, and a signaling amount necessary for the handover to the frequency equal to the frequency used in the specific cell 111B.

In the first embodiment, the processes of the step 30 and the step 40 are performed. However, the processes of the step 30 and the step 40 may be omitted because they are optional.

(Operation and Effect) In the first embodiment, the MeNB 110A instructs the MUE, which is located in the belt-like annular area indicating the range from the distance $L_{MIN}$ to the distance $L_{MAX}$, to perform the handover to the frequency different from the frequency used in the specific cell 111B. Consequently, even when it is not possible to identify an interference source (MUE) of interference given to the specific cell 111B, interference occurring in the specific cell 111B is suppressed.

In the first embodiment, the MeNB 110A determines whether to turn back the frequency used in the aforementioned MUE, with respect to the MUE (that is, the MUE that does not apparently give interference to the specific cell 111B) sufficiently apart from the coverage area of the specific cell 111B, based on a radio state in a frequency (the frequency different from the frequency used in the specific cell 111B) of a handover destination and a signaling amount necessary for handover to a frequency (the frequency equal to the frequency used in the specific cell 111B) of a handover source. Consequently, it is possible to minimize the influence due to the suppression of interference given to the specific cell 111B. That is, it is possible to minimize a change in the assignment of a frequency (a cell) optimized in the mobile communication system 100 as a whole.

First Modification

Hereinafter, a first modification of the first embodiment will be explained. Mainly the differences from the first embodiment will be described, below.

In the first modification, MUE stores a geographical position according to which the handover to the frequency different from the frequency used in the specific cell 111B is instructed. That is, the MUE stores a geographical position of an outer edge of the coverage area of the specific cell 111B.

In the first embodiment, when a frequency used in MUE is turned back to an original frequency, it is of course that the MUE does not store a geographical position.

When the position of the MUE is a stored position, the MUE transmits, to the MeNB 110A, a proximity notification signal (Enhanced Proximity Indication), which indicates that the MUE is located in the vicinity of a specific cell. Furthermore, when the position of the MUE is a stored position and a frequency equal to a frequency used in the specific cell is used, it is preferable that the MUE transmits the proximity notification signal (Enhanced Proximity Indication).

In response to the proximity notification signal, the MeNB 110A instructs the MUE which transmitted the proximity notification signal to perform the handover to the frequency different from the frequency used in the specific cell 111B. Furthermore, in response to the proximity notification signal, the MeNB 110A excludes the frequency used in the specific cell 111B from candidates of a frequency used in the MUE which transmits the proximity notification signal.

Furthermore, a frequency (a cell) currently used in the MUE is also called a "Primary cell". Furthermore, a candidate of a frequency (a cell) used in the MUE is also called a "Secondary cell".

Second Embodiment

Hereinafter, a second embodiment will be explained. Mainly the differences from the first embodiment will be described, below.

Specifically, in the first embodiment, the MeNB 110A instructs the MUE, which is located in the belt-like annular area indicating the range from the distance $L_{MIN}$ to the distance $L_{MAX}$, to perform the handover to the frequency different from the frequency used in the specific cell 111B.

On the other hand, in the second embodiment, the MUE, which is located in the belt-like annular area indicating the range from the distance $L_{MIN}$ to the distance $L_{MAX}$, transmits, to the HeNB 110B, an RACH signal for interference detection. The HeNB 110B notifies the MeNB 110A of a detection result of the RACH signal for interference detection. In the second embodiment, the MeNB 110A may instruct the MUE, which is located in the belt-like annular area indicating the range from the distance $L_{MIN}$ to the distance $L_{MAX}$, to transmit the RACH signal for interference detection.

Here, synchronization between a timing of a subframe in the general cell 111A and a timing of a subframe in the specific cell 111B may not be made. Accordingly, a case is considered, in which within an RACH detection period of the HeNB 110B, the RACH signal for interference detection is not transmitted, and the HeNB 110B is not able to detect the RACH signal for interference detection.

Accordingly, in order for the HeNB 110B to detect the RACH signal for interference detection, a transmission timing of the RACH signal for interference detection is designated by the MeNB 110A.

Specifically, as illustrated in FIG. 10, a timing, at which the MUE transmits an uplink signal to the MeNB 110A, is a time $t_0$. A timing, at which the MeNB 110A receives the uplink signal from the MUE, is a time $t_1$. A timing, at which the MUE receives a downlink signal to from MeNB 110A, is a time $t_2$. Furthermore, the difference between the time $t_0$ and the time $t_1$ and the difference between the time $t_1$ and the time $t_2$ indicate a propagation delay time between the MUE and the MeNB 110A. The difference between the time $t_0$ and the time $t_2$ indicates an adjustment amount between a transmission timing of an uplink signal and a transmission timing of a downlink signal in the general cell 111A, and is called TA (Timing Advance).

As illustrated in FIG. 10, in the MeNB 110A, a timing, at which SFN (System Frame Number) is α and a subframe number is β, is the time $t_1$. Meanwhile, in the HeNB 110B, a timing, at which the SFN (System Frame Number) is α and the subframe number is β, is a time $t_5$.

In such a case, a downlink signal transmitted from the MeNB 110A at the time $t_1$ is received by the HeNB 110B at a time $t_3$. Accordingly, a timing shift amount between the general cell 111A and the specific cell 111B is expressed by the difference (a timing shift amount Y) between the time $t_5$ and the time $t_3$.

Accordingly, the HeNB 110B is able to receive a downlink signal including a known preamble and to detect the timing shift amount Y. The known preamble is information capable of identifying the SFN and the subframe number of the MeNB 110A.

Here, a case is considered, in which a subframe β is an RACH detection period of the HeNB 110B. In such a case, the MUE transmits the RACH signal for interference detection at a time $t_4$, so that the HeNB 110B is able to receive the RACH signal for interference detection at the time $t_5$ and detect the RACH signal for interference detection.

For example, in the case in which the MUE transmits the RACH signal for interference detection in response to the downlink signal transmitted from the MeNB 110A at the time $t_1$, the transmission timing of the RACH signal for interference detection is a time (the time $t_4$ illustrated in FIG. 10) after the timing shift amount Y passed from a reception time (the time $t_2$ illustrated in FIG. 10) of a downlink signal instructing the transmission of the RACH signal for interference detection.

Alternatively, the transmission timing of the RACH signal for interference detection is a time (the time $t_4$ illustrated in FIG. 10) after the TA and the timing shift amount Y passed from a time (the time $t_2$ illustrated in FIG. 10) at which the MUE should transmit RACH to the general cell 111A.

As described above, the transmission timing of the RACH signal for interference detection is determined based on the timing shift amount between the general cell 111A and the specific cell 111B.

As described above, when the RACH signal for interference detection is transmitted from the MUE, the RACH signal for interference detection transmitted from the MUE reaches the MeNB 110A at a time $t_6$. Accordingly, an uplink signal transmitted from another MUE transmitting no RACH signal for interference detection is interfered by the RACH signal for interference detection.

In this regard, in the first embodiment, it is preferable that the MeNB 110A does not assign an uplink radio resource to the general cell 111A and restricts scheduling of the uplink radio resource within an RACH transmission period in which the RACH signal for interference detection is transmitted. As illustrated in FIG. 10, the RACH transmission period, for example, is one subframe period from the time $t_5$.

That is, when transmitting a downlink signal instructing the transmission of the RACH signal for interference detection at the time $t_1$, it is preferable that the MeNB 110A does not assign the uplink radio resource to the general cell 111A over one subframe period after a time (the time $t_5$ illustrated in FIG. 10), at which X+Y+$P_{TA}$ passed, from the time $t_1$. In addition, the $P_{TA}$ indicates a TA value at which HUE located at a cell edge of the HeNB 110B is expected to be considered by the HeNB 110B. The $P_{TA}$ may be a fixed value, or the HeNB 110B knows the $P_{TA}$ in advance.

Alternatively, the MeNB 110A may not assign the uplink radio resource to the general cell 111A over one subframe period after a time (the time $t_5$ illustrated in FIG. 10), at which 2X+Y passed, from the time $t_1$.

(Operation of Mobile Communication System)

Hereinafter, the operation of the mobile communication system according to the second embodiment will be described. FIG. 11 is a sequence diagram illustrating an operation of the mobile communication system 100 according to the second embodiment.

As illustrated in FIG. 11, in step 110, the HeNB 110B transmits (notifies), to the MeNB 110A, an interference report indicating that interference occurs in the specific cell 111B.

In step 120, the HeNB 110B transmits (notifies), to the MeNB 110A, RACH configuration information (RACH Config information) of the HeNB 110B and a timing shift amount. The RACH configuration information defines RACH, and defines rootSequenceIndex used in the RACH, timings at which the RACH can be transmitted, an available range of a random access preamble, and the like. That is, the RACH configuration information is an example of the RACH parameter candidate.

In step 130, the MeNB 110A transmits the RACH parameter (for example, the random access preamble and the PRACH mask index) to the MUE. Furthermore, the MeNB 110A acquires the timings, at which the RACH can be transmitted, based on the RACH configuration information, and identifies the transmission timing of the RACH signal for interference detection of the acquired timings by the PRACH mask index. The RACH signal for interference detection codes a portion indicated by the random access preamble, based on a cyclic code of the rootSequenceIndex.

Here, it is noted that a downlink signal including the RACH parameter and the transmission timing of the RACH signal for interference detection is a downlink signal instructing the transmission of the RACH signal for interference detection.

In step 140, the MUE transmits the RACH signal for interference detection using the RACH parameter received from the MeNB 110A, at the transmission timing received from the MeNB 110A.

In step 150, the HeNB 110B transmits (notifies), to the MeNB 110A, the detection result (for example, the random access preamble and the PRACH mask index) of the RACH signal for interference detection.

Here, when a reception level of the RACH signal for interference detection is equal to or more than a predetermined threshold value, the HeNB 110B may transmit the detection result of the RACH signal for interference detection.

In step 160, the MeNB 110A identifies MUE (hereinafter, interfering MUE), which gives interference to the specific cell 111B, based on the detection result (the random access preamble and the PRACH mask index) of the RACH signal for interference detection.

In step 170, the MeNB 110A instructs the identified interfering MUE to perform handover to a frequency different from a frequency used in the specific cell 111B.

(Operation and Effect)

In the second embodiment, the RACH signal for interference detection is transmitted from the MUE to the HeNB 110B and the detection result of the RACH signal for interference detection is notified by the HeNB 110B to the MeNB 110A. Consequently, the MeNB 110A is able to identify an interference source (MUE) of interference, which is given to the specific cell 111B, according to the detection result of the RACH signal for interference detection.

In the second embodiment, the transmission timing of the RACH signal for interference detection is transmitted from the MeNB 110A to the MUE. The transmission timing of the RACH signal for interference detection is determined based on the timing shift amount between the general cell 111A and the specific cell 111B. Consequently, even when synchronization between a timing of a subframe in the general cell 111A and a timing of a subframe in the specific cell 111B is not made, the HeNB 110B is able to detect the RACH signal for interference detection transmitted from the MUE.

First Modification

Hereinafter, a first modification of the second embodiment will be explained. Mainly the differences from the first embodiment will be described, below.

In the first modification, a random access preamble for generating the RACH signal for interference detection is different from a random access preamble for generating the RACH used in the specific cell 111B.

Here, in the 3GPP standards, a random access preamble is classified into a plurality of groups. The HeNB 110B selects a group, which is different from a group including the random access preamble used in the specific cell 111B, as the RACH parameter candidate. Alternatively, the HeNB 110B may assign, among available random access preambles, a random access preamble in a predetermined period to the RACH signal for interference detection, and prohibit the use of a random access preamble in another period other than the predetermined period.

Other Embodiments

The present invention is explained through the above embodiment, but it must not be assumed that this invention is limited by the statements and the drawings constituting a part of this disclosure. From this disclosure, various alternative embodiments, examples, and operational technologies will become apparent to those skilled in the art.

In the embodiment, the MeNB 110A was exemplified as the general base station that manages the general cell, and the HeNB 110B was exemplified as the specific base station that manages the specific cell. However, the general base station that manages the general cell may be the MNB 210A. Furthermore, the specific base station that manages the specific cell may be the HNB 210B.

In the embodiment, the HeNB 110B receives a downlink signal including a known preamble, and detects a timing shift amount. However, the embodiment is not limited thereto.

Specifically, the timing shift amount may be determined based on the difference between a synchronization timing of a downlink signal in the general cell 111A and a synchronization timing of a downlink signal in the specific cell 111B in handover from the general cell 111A to the specific cell 111B. More specifically, the timing shift amount may be a minimum value of the difference, a maximum value of the difference, or an average value of the difference.

Alternatively, the timing shift amount may be determined based on the difference between a synchronization timing of a downlink signal in the specific cell 111B and a synchronization timing of a downlink signal in the general cell 111A in handover from the specific cell 111B to the general cell 111A. More specifically, the timing shift amount may be a minimum value of the difference, a maximum value of the difference, or an average value of the difference.

The entire content of U.S. Provisional Application No. 61/555,174 (filed on Nov. 3, 2011) is incorporated by reference.

INDUSTRIAL APPLICABILITY

According to the present invention, even when it is not possible to identify a general mobile terminal that gives interference to the specific cell, interference occurring in the specific cell is suppressed.

The invention claimed is:

1. A first base station in a mobile communication system including the first base station that manages a first cell and a second base station that manages a second cell having a coverage area smaller than a coverage area of the first cell, wherein a distance between an edge closest to the first base station among edges of a coverage area of the second cell and the first base station is a distance $L_{MIN}$, a distance between an edge most distant from the first base station among the edges of the coverage area of the second cell and the first base station is a distance $L_{MAX}$, and the first base station comprising:

a control unit configured to instruct a first mobile terminal to perform handover to a frequency different from a frequency used in the second cell, the first mobile terminal being located in a belt-like annular area indicating a range from the distance $L_{MIN}$ to the distance $L_{MAX}$ among first mobile terminals being mobile terminals in a connected state in the first cell, wherein the belt-like annular area is determined based on a difference between a synchronization timing of a downlink signal of a mobile terminal to perform handover from the first cell to the second cell and a synchronization timing of an uplink signal of the mobile terminal to perform handover from the first cell to the second cell.

2. A first base station in a mobile communication system including the first base station that manages a first cell and a second base station that manages a second cell having a coverage area smaller than a coverage area of the first cell, wherein a distance between an edge closest to the first base station among edges of a coverage area of the second cell and the first base station is a distance $L_{MIN}$, a distance between an edge most distant from the first base station among the edges of the coverage area of the second cell and the first base station is a distance $L_{MAX}$, and the first base station comprising:

a control unit configured to instruct a first mobile terminal to perform handover to a frequency different from a frequency used in the second cell, the first mobile terminal being located in a belt-like annular area indicating a range from the distance $L_{MIN}$ to the distance $L_{MAX}$ among first mobile terminals being mobile terminals in a connected state in the first cell, wherein the belt-like annular area is determined based on a synchronization timing correction value of an uplink signal of a mobile terminal to perform handover from the second cell to the first cell.

* * * * *